(12) United States Patent
Graham

(10) Patent No.: US 11,910,954 B2
(45) Date of Patent: Feb. 27, 2024

(54) COVER OR LID COUNTERBALANCE ASSEMBLY

(71) Applicant: Weber Knapp Company, Jamestown, NY (US)

(72) Inventor: Daniel Mark Graham, Ashville, NY (US)

(73) Assignee: Weber Knapp Company, Jamestown, NY (US)

( * ) Notice: Subject to any disclaimer, the term of this patent is extended or adjusted under 35 U.S.C. 154(b) by 497 days.

(21) Appl. No.: 17/231,096

(22) Filed: Apr. 15, 2021

(65) Prior Publication Data

US 2022/0330747 A1 Oct. 20, 2022

(51) Int. Cl.
*A47J 36/12* (2006.01)
*A47J 37/07* (2006.01)
*E05F 1/10* (2006.01)

(52) U.S. Cl.
CPC .............. *A47J 36/12* (2013.01); *E05F 1/1075* (2013.01); *E05Y 2201/416* (2013.01)

(58) Field of Classification Search
CPC ...... A47J 36/12; A47J 37/0786; E05F 1/1075; E05Y 2201/416
See application file for complete search history.

(56) References Cited

U.S. PATENT DOCUMENTS

| | | | | |
|---|---|---|---|---|
| 1,310,647 | A * | 7/1919 | Casper | E05C 17/32 217/60 E |
| 2,626,420 | A * | 1/1953 | Mongin | E05F 5/027 16/80 |
| 6,581,587 | B1 * | 6/2003 | Helms | A47J 37/0704 126/41 R |
| 6,789,537 | B1 * | 9/2004 | Lutz | A47J 36/12 126/41 R |
| 7,677,540 | B1 * | 3/2010 | Duval | F16M 11/046 267/221 |
| 10,822,851 | B2 | 11/2020 | Graham et al. | |
| 2005/0081721 | A1 * | 4/2005 | Craycraft | A47J 37/0718 99/450 |
| 2018/0044960 | A1 * | 2/2018 | Saylor | E05F 1/1075 |
| 2019/0229511 | A1 * | 7/2019 | Byrne | F21V 23/06 |
| 2020/0232264 | A1 * | 7/2020 | Saylor | E05F 1/1075 |
| 2022/0098913 | A1 * | 3/2022 | Saylor | A47L 15/4261 |

FOREIGN PATENT DOCUMENTS

| | | | | |
|---|---|---|---|---|
| CN | 201589306 U | * | 9/2010 | |
| CN | 201764564 U | * | 3/2011 | |
| CN | 203797752 U | * | 8/2014 | |
| DE | 10134592 A1 | * | 1/2003 | ............ E05F 1/1075 |
| GB | 654766 A | * | 6/1951 | |

* cited by examiner

*Primary Examiner* — Jorge A Pereiro
*Assistant Examiner* — Logan P Jones
(74) *Attorney, Agent, or Firm* — Simpson & Simpson, PLLC

(57) ABSTRACT

A lid counterbalance assembly for a grill, the grill including a lid and a base, the lid counterbalance assembly including a pulley assembly including at least one pulley, the pulley assembly rotatably connected to the base, a spring connected to the pulley assembly via a first line, and a second line including a first end connected to the pulley assembly and a second end connected to the lid, wherein the second end is rotatable and translatable with respect to the lid.

15 Claims, 12 Drawing Sheets

COVER OR LID COUNTERBALANCE ASSEMBLY

FIELD

The present disclosure relates to hinged cover assemblies, and more particularly, to lid counterbalance and assist assemblies for grills and smokers.

BACKGROUND

A barbecue grill or smoker is a device that cooks food by applying heat from below. Many grills comprise a base, which houses either the gas burners or charcoal, and a lid, also known as a cover or hood. The lid is hingedly connected to the base. The hinged connection between the lid and the base enables the lid to be closed to trap the heat, and opened to add, remove, or check on the food being cooked therein. However, as the development of grill technology advances, the demand for grills having dense or heavy lids has increased. For example, customers prefer the look of stainless steel, which is generally a dense metal. Additionally, certain types of dense metal may have better heat transfer qualities, that is, heat cannot escape from the cooking area as quickly as less dense metals. The use of such dense materials in grills has made the opening and closing of the lid much more difficult. Furthermore, controlling the movement of the lid relative to the base has also become much more difficult.

Thus, there is a long felt need for a lid counterbalance and assist assembly operatively arranged to assist in the opening and closing of the lid. There is also a long felt need for a lid counterbalance and assist assembly including a lock out feature to prevent unwanted displacement of the lid relative to the base.

SUMMARY

According to aspects illustrated herein, there is provided a lid counterbalance assembly for a grill, the grill including a lid and a base, the lid counterbalance assembly comprising a pulley assembly including at least one pulley, the pulley assembly rotatably connected to the base, a spring connected to the pulley assembly via a first line, and a second line comprising a first end connected to the pulley assembly and a second end connected to the lid, wherein the second end is rotatable and translatable with respect to the lid.

In some embodiments, the lid counterbalance assembly further comprises a link rotatably connected to the second end, wherein the link comprises a slotted hole operatively arranged to engage a pin extending from the lid. In some embodiments, in a first state of the lid counterbalance assembly, the pin is engaged with a first end of the slotted hole, and in a second state of the lid counterbalance assembly, the pin is engaged with a second end of the slotted hole. In some embodiments, the lid counterbalance assembly further comprises a housing operatively arranged to be fixedly secured to the base, wherein the pulley assembly and the spring are connected to the housing. In some embodiments, the pulley assembly is connected to the base via a friction bearing. In some embodiments, the at least one pulley comprises a first pulley, and a second pulley non-rotatably connected to the first pulley. In some embodiments, the first line is fixedly secured to the first pulley and the second line is fixedly secured to the second pulley. In some embodiments, the first pulley comprises a constant diameter and the second pulley comprises a constant diameter. In some embodiments, the first pulley comprises a variable diameter and the second pulley comprises a constant diameter. In some embodiments, the lid counterbalance assembly further comprises a lockout bracket operatively arranged to engage the pulley assembly to prevent displacement of the pulley assembly in a first circumferential direction. In some embodiments, the pulley assembly further comprises a radially outward extending catch operatively arranged to engage the lockout bracket. In some embodiments, the pulley assembly further comprises a radially outward extending lobe operatively arranged to displace the lockout bracket in the first circumferential direction.

According to aspects illustrated herein, there is provided a grill assembly, comprising a base, a lid hingedly connected to the base, and a counterbalance assembly, including a pulley assembly rotatably connected to the base, the pulley assembly comprising a first pulley, and a second pulley non-rotatably connected to the first pulley, a spring connected to the first pulley via a first line, the spring biasing the pulley assembly in a first circumferential direction, and a second line comprising a first end connected to the second pulley and a second end connected to the lid, wherein the second end is rotatable and translatable with respect to the lid.

In some embodiments, the lid comprises a pin extending therefrom, and the counterbalance assembly further comprises a link rotatably connected to the second end, the link comprising a slotted hole engaged with the pin. In some embodiments, in a first state of the lid counterbalance assembly, the pin is engaged with a first end of the slotted hole, and in a second state of the lid counterbalance assembly, the pin is engaged with a second end of the slotted hole. In some embodiments, the first pulley comprises a constant diameter and the second pulley comprises a constant diameter. In some embodiments, the first pulley comprises a variable diameter and the second pulley comprises a constant diameter. In some embodiments, the lid counterbalance assembly further comprises a lockout bracket operatively arranged to engage a radially extending catch of the pulley assembly to prevent displacement of the pulley assembly in the first circumferential direction. In some embodiments, the pulley assembly further comprises a radially outward extending lobe operatively arranged to displace the lockout bracket in the first circumferential direction to disengage the catch.

According to aspects illustrated herein, there is provided a grill assembly, comprising a base, a lid hingedly connected to the base, the lid comprising a pin, and a counterbalance assembly, including a pulley assembly rotatably connected to the base, the pulley assembly comprising a first pulley, and a second pulley non-rotatably connected to the first pulley, a spring connected to the first pulley via a first line, and a link connected to the second pulley via a second line, the link comprising a slotted hole engaged with the pin.

According to aspects illustrated herein, there is provided a cover or lid or hood counterbalance assembly for a grill or smoker. In some embodiments, the lid counterbalance assembly provides torque on the lid to balance the effects of gravity on the lid through the opening range (for fully counterbalanced state). In some embodiments, the lid counterbalance assembly comprises a rotatable link at the point where the spring cable attaches to the lid to create an open bias condition. This allows for self-opening near the opened position. In some embodiments, the lid counterbalance assembly comprises a variable radius pulley between the spring and the lid to create a closing bias near the closed position. In some embodiments, the lid counterbalance assembly provides rotation friction to the system to compensate for mismatches in lid torque to spring torque due to manufacturing tolerances in the grill lid and the counterbalance. In some embodiments, the lid counterbalance assembly comprises a feature that locks out the counterbalance torque when the grill is tipped forward with the lid open. This prevents the counterbalance torque from causing the lid to suddenly close and potentially flip the grill over. In such embodiments, no separate unlocking action is required by the user to deactivate the lock-out feature. Normal operation of the grill lid will disengage the lock-out feature.

In some embodiments, the lid counterbalance assembly can be set in an open bias condition or state through the use of a slotted link. The link that attaches the cable to the lid comprises an opening (i.e., slotted hole) that allows it to rotate within a specified range. This rotation changes the line of action of the cable and the output torque of the counterbalance to yield an open bias condition. In some embodiments, in the open bias state of the lid counterbalance assembly, the pulley comprises a constant radius.

In some embodiments, the lid counterbalance assembly can be set in a closed bias condition or state by connecting the springs to one side of the pulley via a first cable and the lid to the other side of the pulley via a second cable (i.e., there are two separate cables). The spring side of the pulley comprises a variable radius or radii, which allows the spring torque to be modified to create a close bias near the closed position.

In some embodiments, the lid counterbalance assembly can be set in an open bias condition and a closed bias condition through the use of a slotted hole in the link and a variable pulley.

In some embodiments, the lid counterbalance assembly comprises a lockout for tipped conditions of the grill. The counterbalance torque output is unaffected by the attitude of the grill. In the open state of the lid, the counterbalance is applying a closing torque to counteract the opening torque due to gravity. When the grill is tipped forward the opening torque due to gravity is decreased. This tipping action, required by various agencies for grill and smoker certification, when combined with the counterbalance closing toque could cause the lid to slam closed which would result in a testing/certification failure. The counterbalance lockout feature engages at a low tip angle and eliminates the counterbalance closing toque. This prevents the lid from slamming closed as it is tipped further (typically 10°-15°). When the grill is in an untipped open condition, the lockout bracket is disengaged from the pulley by the operator closing the lid normally. The steps or catches on the pulley move away from the lockout bracket and a lobe on the pulley pushes the lockout bracket back into its disengaged resting position. When the grill is tipped forward (e.g., 10°), the lockout bracket rotates due to gravity to engage steps on the outside profile of the pulley preventing spring force from being transmitted to the lid.

In some embodiments, the lid counterbalance assembly further comprises a friction element. The friction element adds friction to the system through the pulley pivot using, for example, a conical rotation friction device construction.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
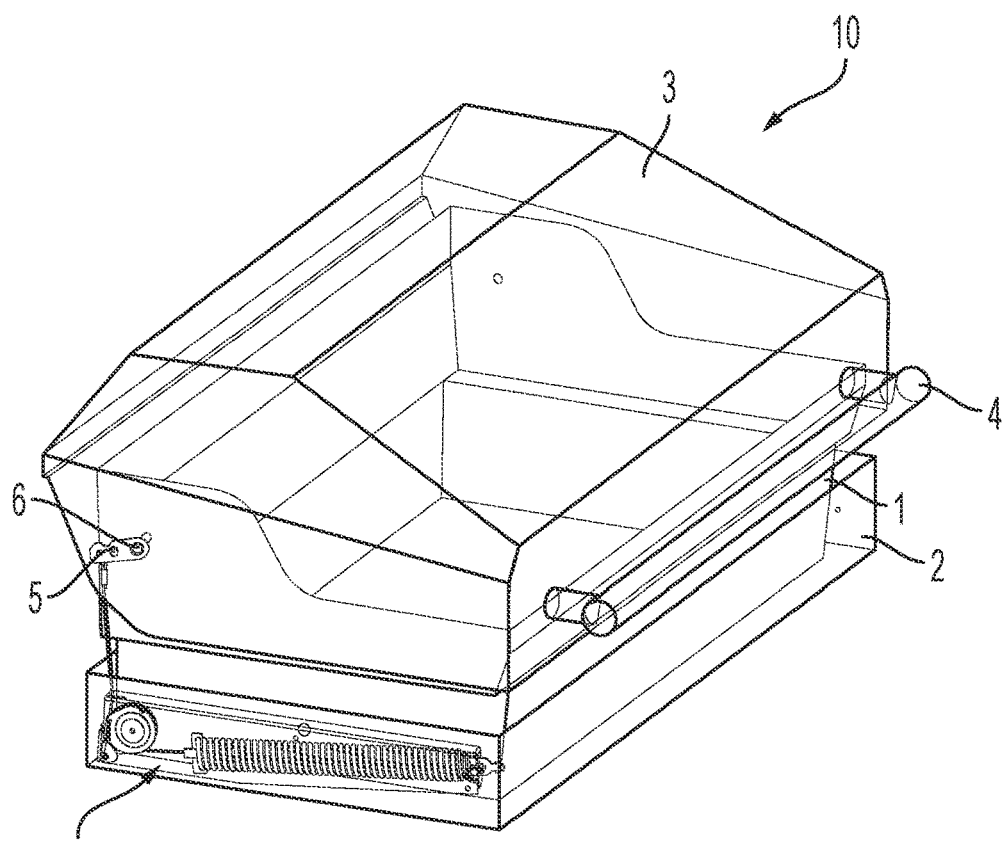
FIG. 1A is a perspective view of a grill assembly in, a closed state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

It should be appreciated that the term grill as used herein can also mean smoker, and that the assemblies of the present disclosure can be applied to both grills and smokers. It should also be appreciated that the term lid is synonymous with the terms cover and hood, and that these terms as used herein are intended to mean the same thing, namely, the top portion of the grill or smoker that is hingedly connected to the base and operatively arranged to cover the food being cooked therein.

Figure 1B:
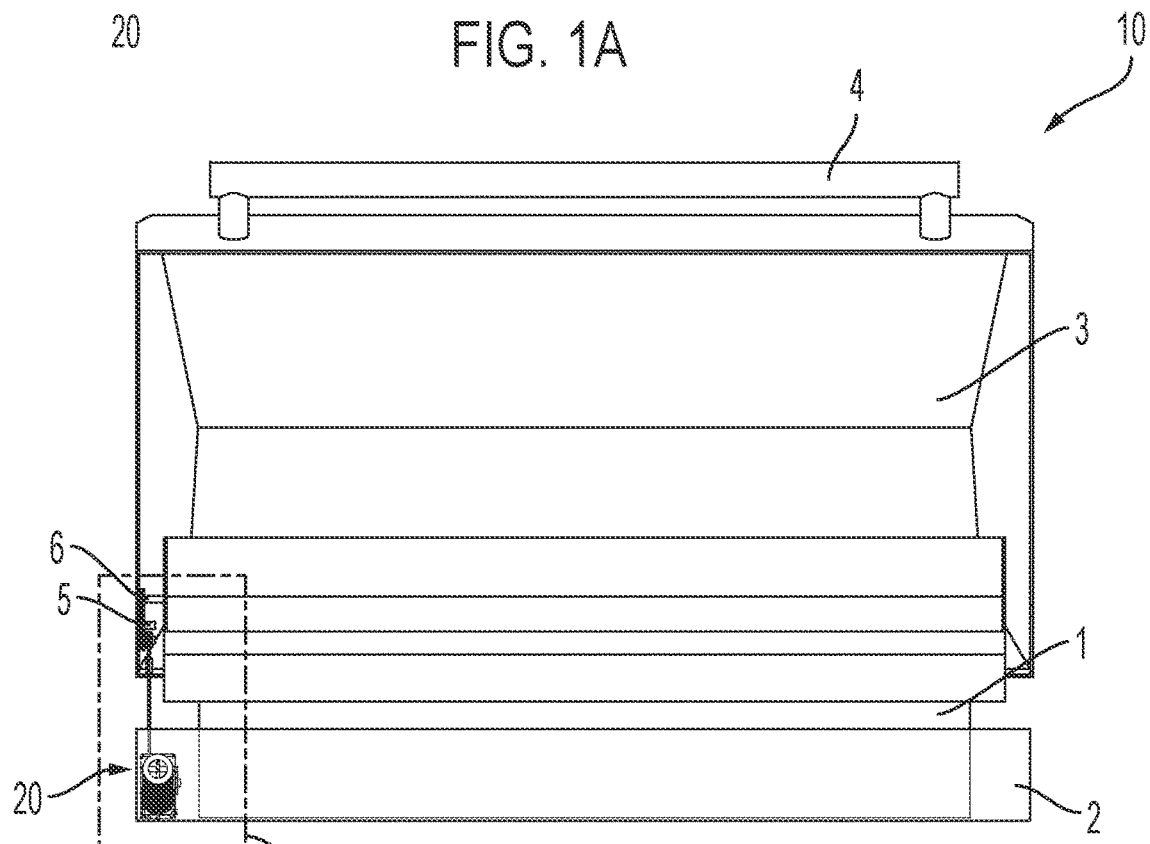
FIG. 1B is a front elevational view of the grill assembly shown in FIG. 1A, in an open state.
Figure 2:
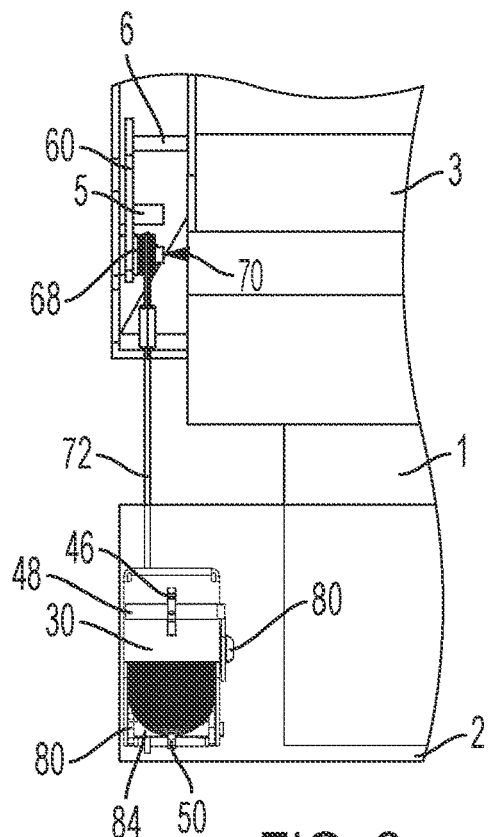
FIG. 2 is a detail view of the grill assembly taken generally along detail 2 in FIG. 1B.

Referring now to the figures, FIG. 1A is a perspective view of grill assembly 10 in, a closed state. FIG. 1B is a front elevational view of grill assembly 10, in an open state. FIG. 2 is a detail view of grill assembly 10 taken generally along detail 2 in FIG. 1B. Grill assembly 10 generally comprises base 1, lid 3 hingedly connected to base 1, and lid counterbalance assembly 20. In some embodiments, base 1 further comprises skirt 2 arranged therearound. In some embodiments, skirt 2 is fixedly secured to base 1. Lid 3 comprises handle 4.

Figure 3:
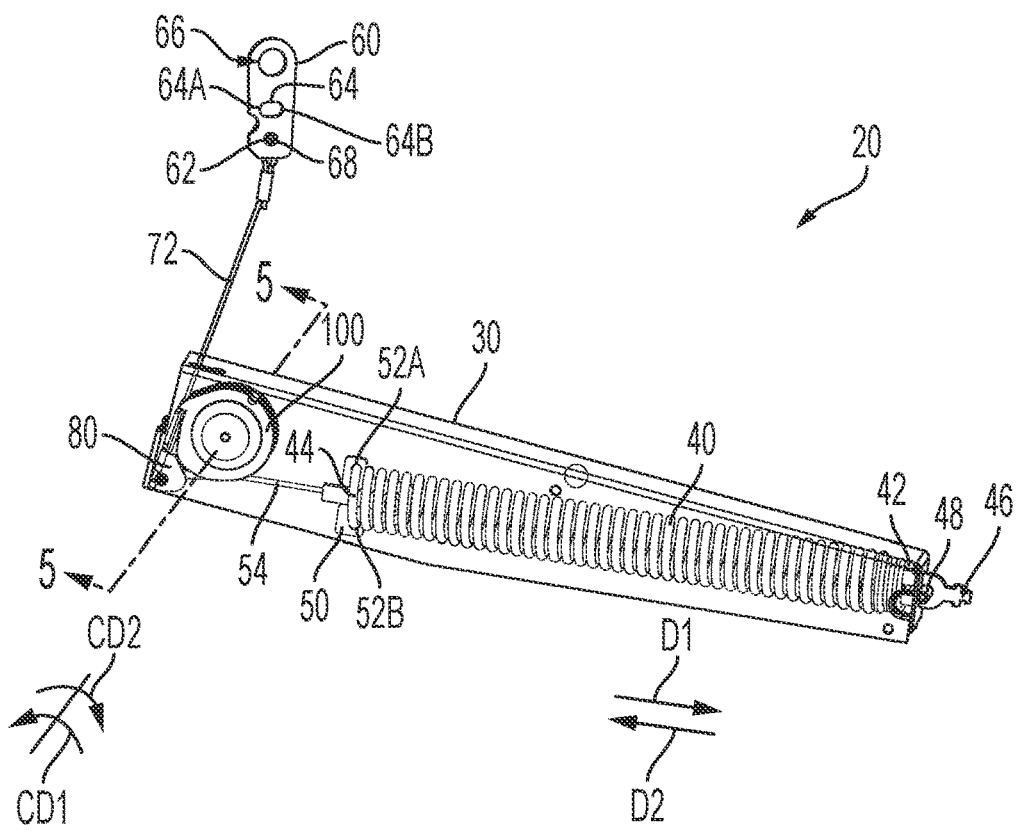
FIG. 3 is a perspective view of a lid counterbalance assembly.
Figure 4:
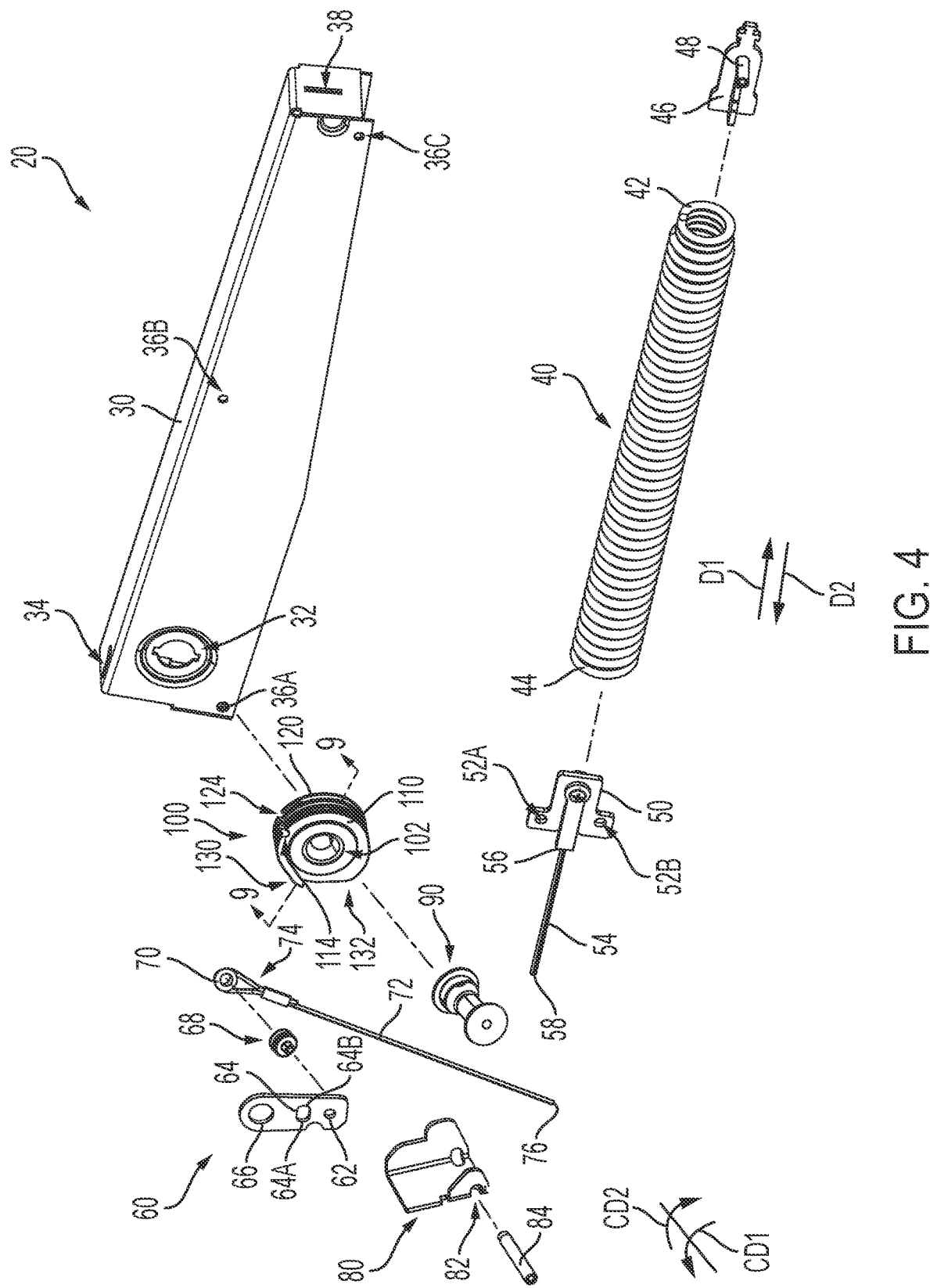
FIG. 4 is an exploded perspective view of the lid counterbalance assembly shown in FIG. 3.
Figure 5:
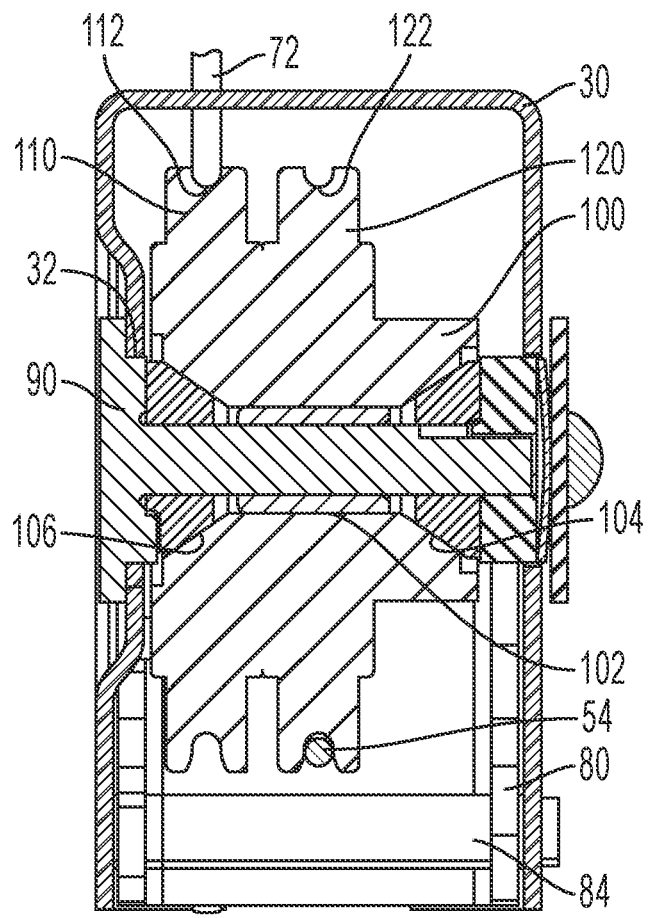
FIG. 5 is a cross-sectional view of the lid counterbalance assembly taken generally along line 5-5 in FIG. 3.

FIG. 3 is a perspective view of lid counterbalance assembly 20. FIG. 4 is an exploded perspective view of lid counterbalance assembly 20. FIG. 5 is a cross-sectional view of lid counterbalance assembly 20 taken generally along line 5-5 in FIG. 3. Lid counterbalance assembly 20 generally comprises housing 30, spring 40, at least one line, for example line 54 and line 72, link 60, and pulley assembly 100. It should be appreciated that lines 54 and 72 may comprise any suitable connecting means, such as, for example, cable, wire, string, chain, rope, twine, metal strap, strap, etc. In some embodiments, lid counterbalance assembly 20 further comprises lockout bracket 80. Lid counterbalance assembly 20 provides torque to balance the effects of gravity on lid 3 through the opening range (i.e., fully counterbalanced). The following description should be read in view of FIGS. 1A-5.

Housing 30 is operatively arranged to be secured to a grill, for example, to base 1 and/or skirt 2. Housing 30 comprises a plurality of holes, for example, hole 32, hole or slot 34, holes 36A-C, and hole or slot 38. Hole 32 is operatively arranged to engage a shaft or bearing of pulley assembly 100 to rotatably connect pulley assembly 100 to housing 30. In some embodiments, lid counterbalance assembly 20 comprises friction bearing 90 operatively arranged to rotatably connect pulley assembly 100 to housing 30. In some embodiments, friction bearing 90 can be adjusted to add rotational friction between lid 3 and base 1, for example like the friction bearings disclosed in U.S. Pat. No. 10,822,851 (Graham et al.), which patent is incorporated herein by reference in its entirety. Friction bearing 90 provides rotation friction to the system to compensate for mismatches in lid torque to spring torque due to manufacturing tolerances in the grill lid and the counterbalance assembly. As best shown in FIG. 5, friction can be added to the system through the pulley pivot using a conical rotational friction device construction (i.e., tightening friction bearing 90 causes wedges to engage resulting in increased friction and loosening friction bearing 90 results in decreased friction). In some embodiments, hole 32 is a through-bore extending through housing 30. In some embodiments, hole 32 comprises a depression or counterbore or countersink. Line 72 extends out of housing 30 via hole 34 to connect lid 3 to pulley assembly 100. Hole 36A is operatively arranged to engage pin 84 to rotatably connect lockout bracket 80 to housing 30. Housing 30 is secured to base 1 and/or skirt 2 via holes 36B, 36C, and/or 32 and bolts. However, it should be appreciated that housing 30 can be secured to base 1 and/or skirt 2 via any suitable means, for example, screws, nails, pins, rivets, dowels, welding, soldering, adhesives, etc. Slot 38 is operatively arranged to engage connector 46 to connect spring 40 to housing 30, as will be described in greater detail below.

Spring 40 is generally a coil spring arranged in housing 30 comprising end 42 and end 44. End 42 is connected to housing 30 via connector 46. Specifically, connector 46 is connected to end 42 and extends through slot 38. Rod 48 is arranged in a hole in connector 46 to fixedly secure end 42 to housing 30. In some embodiments, spring 40 is tapered or frusto-conical at end 42. End 44 is connected to line 54 via connector 50. Connector 50 comprises at least one hole, for example holes 52A-B. End 44 is fed through holes 52A-B to secure spring 40 to connector 50, as best shown in FIG. 3. Line 54 is fixedly secured to connector 50 and comprises end 56 and end 58. For example, end 56 is secured to connector 50 via a screw. However, it should be appreciated that end 56 can be secured to connector 50 via any suitable means, for example, bolts, nails, pins, rivets, dowels, welding, soldering, adhesives, etc. End 58 is connected to pulley assembly 100. Specifically, end 58 is fixedly secured to pulley assembly 100 as will be described in greater detail below.

Pulley assembly 100 generally comprises through-bore 102, pulley 110, and pulley 120. Pulley 110 comprises groove 112 and channel 114. Pulley 120 is non-rotatably connected and arranged adjacent to pulley 110 and comprises groove 122 and channel 124. Pulley 120 and pulley 110 are concentrically aligned, that is, about the same center axis of through-bore 102. In some embodiments, pulley 120 is fixedly secured to pulley 110. Shaft or friction bearing 90 extends through through-bore 102 to rotatably connect pulley assembly 100 to housing 30. In some embodiments, spring 40 is connected to pulley 120 via line 54 and link 60 is connected to pulley 110 via line 72. In some embodiments, pulley assembly 100 comprises one pulley and both of lines 54 and 72 are connected thereto. In some embodiments, and as shown, end 58 is fixedly secured in groove 122. For example, end 58 may be connected to a perpendicular rod that engages channel 124. Similarly, end 76 of line 72 is fixedly secured in groove 112. For example, end 76 may be connected to a perpendicular rod that engages channel 114. It should be appreciated that lines 54 and 72 may be connected to pulley assembly 100 via any suitable means, for example, screws, nails, pins, rivets, dowels, welding, soldering, adhesives, etc. In some embodiments, through-bore 102 comprises radially inward facing surfaces or counter-sinks 104 and 106. Frusto-conical surfaces 104 and 106 are operatively arranged to engage wedges of friction bearing 90 to increase or decrease rotational friction of pulley assembly 100 with respect to housing 30. Decreasing friction of friction bearing 90 results in lid 3 being more freely rotatable displaceable, whereas increasing friction of friction bearing 90 results in lid 3 being less freely rotatably displaceable. In some embodiments, pulley assembly 100 further comprises catch 130 and lobe 132. Catch 130 is a radially outward extending protrusion operatively arranged to engage lockout bracket 80 to remove spring bias from lid 3. This is desirable if, for example, grill assembly 10 is arranged on a graded surface and will be described in greater detail below with respect to FIGS. 11A-B. Lobe 132 is operatively arranged to engage lockout bracket 80 to disengage lockout bracket 80 from catch 130. As pulley assembly 100 is rotated, lobe 132 rotatably displaces lockout bracket 80 away from pulley assembly 100, thus disengaging it from catch 130.

Link 60 is connected to pulley assembly 100 via line 72. Line 72 comprises end 74 and end 76 fixedly secured to pulley assembly 100. End 74 is connected to link 60 via connector 68 and connector 70. Connectors 68 and 70 allow for rotatable connection between link 60 and line 72. It should be appreciated that line 72 may be connected to link 60 via any means suitable for rotatable connection, for example, bolts, rivets, nails, screws, dowels, pins, etc.

Link 60 generally comprises a plate operatively arranged to connect line 72 to lid 3 in order to create a desirable and shiftable bias on lid 3 (e.g., open bias or closing bias) to aid in displacement of lid 3 relative to base 1. Link 60 comprises hole 62 and hole or slot 64. Hole 62 is operatively arranged to engage connector 68 to rotatably connect link 60 with line 72. Hole 64 comprises a slot or ovular or ellipsoidal or elongate shape and comprises end 64A and end 64B. Hole 64 is operatively arranged to engage pin 5 of lid 3. The elongate shape of hole 64 allows link 60 to shift from, for example, an open bias to aid in opening lid 3 or a closing bias to aid in closing lid 3, as will be described in greater detail below. In some embodiments, link 60 further comprises hole 66. Hole 66 is rotatably engaged with pin 6. Pin 6 rotatably connects lid 3 and base 1, thereby providing a hinged or rotatable connection between lid 3 and base 1. Pin 6 may comprise a bearing, bolt, shaft, etc. It should be appreciated, however, that lid 3 may be hingedly or rotatably connected to base 1 using any suitable means. Link 60 is "rotatable" and connects line 72, and essentially spring 40, to lid 3 to create an open bias condition. This allows for self-opening near the opening position or the closed state. Specifically, opening or hole 64 allows link 60 to rotate within a specified range. This rotation changes the line of action of the cable and the output torque of the counterbalance assembly 20 to yield an open bias condition or a close bias condition. It should be appreciated that, although the present disclosure shows link 60 as a separate component from lid 3, line 72 can be directly connected to a slotted hole in lid 3 to allow for the same "shift" action. For example, end 74 of line 72 can be connected to an oblong or ellipsoidal hole in lid 3 via connector 68, wherein connector 68 allows for rotational connection between line 72 and lid 3 and also is slidable within the hole.

Lockout bracket 80 is rotatably connected to housing 30 via pin 84 and hole 36A. Lockout bracket 80 is operatively arranged to displace in circumferential direction CD2 to engage catch 130 of pulley assembly 100, thereby removing spring bias from spring 40 on link 60 and thus lid 30. Lobe 132 is operatively arranged to engage lockout bracket 80 to displace it in circumferential direction CD1 to disengage it from catch 130. In some embodiments, housing 30 prevents or limits circumferential displacement of lockout bracket 80 in circumferential direction CD1. Lockout bracket 80 is operatively arranged to lock out the counterbalance torque when grill assembly 10 is tipped forward with lid 3 in the open state. This prevents the counterbalance torque from causing the lid to suddenly close and potentially flip the grill over. No separate unlocking action is required by the user to deactivate this feature, and normal operation of the grill lid will disengage this feature. Lockout bracket 80 will be described in greater detail below with respect to FIGS. 11A-B.

Figure 6A:
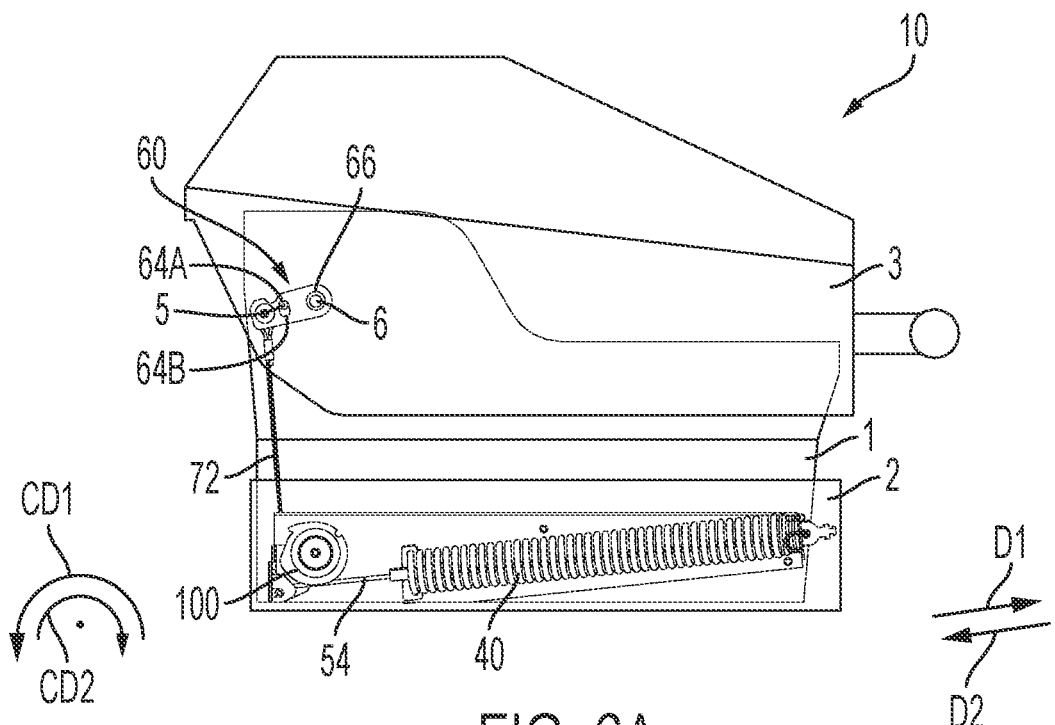
FIG. 6A is a side elevational view of the grill assembly shown in FIG. 1A in the closed state.

FIG. 6A is a side elevational view of grill assembly 10 in the closed state. In the closed state, link 60 is arranged such that pin 5 is engaged with end 64A of hole 64. In such arrangement, spring 40 provides a linear biasing force on line 54 in direction D1, which is translated into a rotatable biasing force or torque on lid 3 in circumferential direction CD1, or, an open bias. The open bias aids in the opening of lid 3. This is especially desirable as the material of lid 3 becomes denser adding to its mass. Essentially, pin 5 acts as a fulcrum on end 64A, with line 72 pulling lid 3 in circumferential direction CD1 therearound.

Figure 6B:
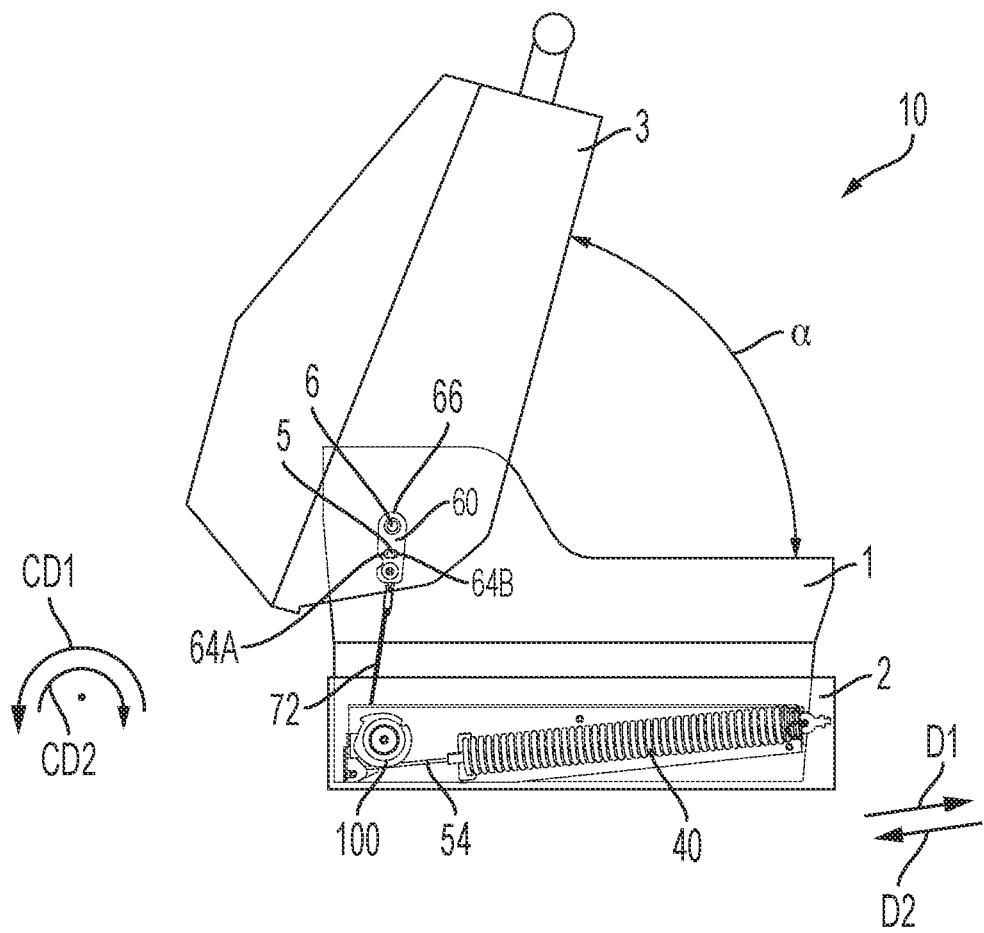
FIG. 6B is a side elevational view of the grill assembly shown in FIG. 1A in a balanced state.

FIG. 6B is a side elevational view of grill assembly 10 in a balanced state. In the balanced state, lid 3 is arranged at angle α relative to base 1 and link 60 is arranged such that pin 5 is arranged between, and disengaged with, both of ends 64A-B. Link 60, including hole 66, hole 64, and hole 62, and line 72 are generally linearly aligned. In such arrangement, there is no circumferential bias or torque on lid 3 from spring 40. FIG. 6B shows the balanced state or balance point, wherein the center of gravity is directly above the pivot.

Figure 6C:
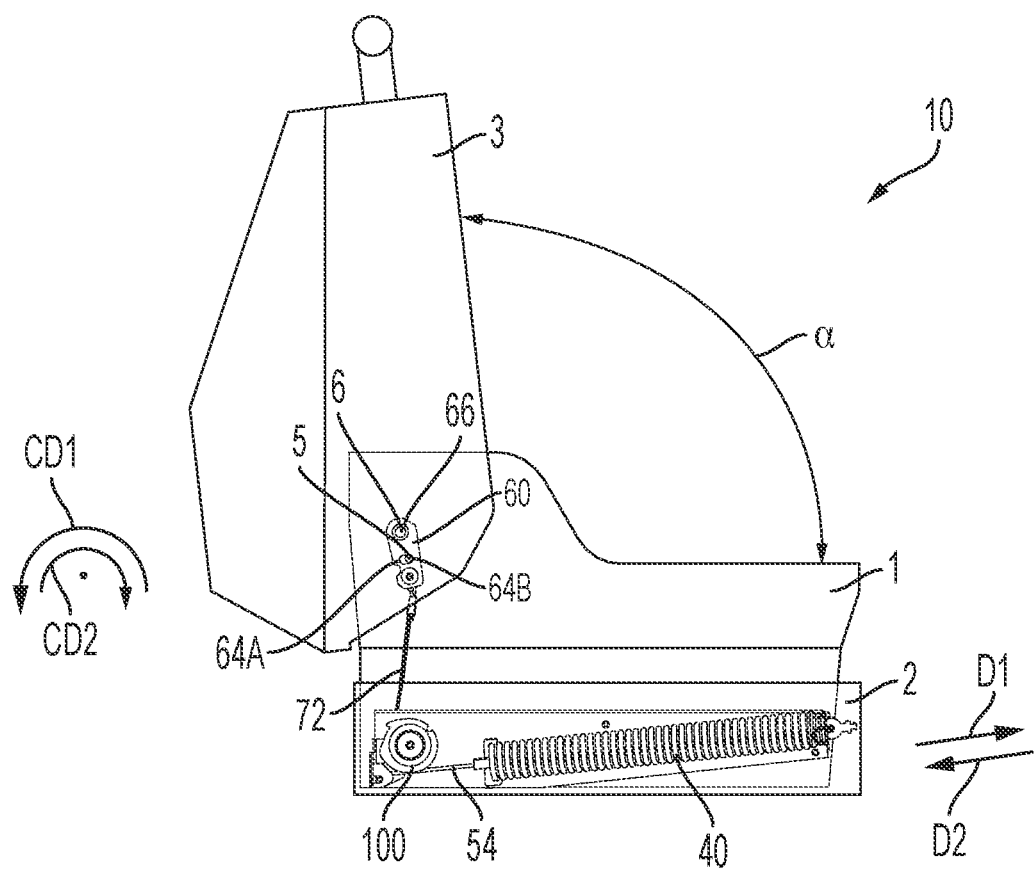
FIG. 6C is a side elevational view of the grill assembly shown in FIG. 1A in the open state.

FIG. 6C is a side elevational view of grill assembly 10 in the open state. In the open state, lid 3 is arranged at angle α relative to base 1 and link 60 is arranged such that pin 5 is engaged with end 64B of hole 64. Angle α in the open state as shown in FIG. 6C is greater than angle α in the balanced state as shown in FIG. 6B. In such arrangement, spring 40 provides a linear biasing force on line 54 in direction D1, which is translated into a rotatable biasing force or torque on lid 3 in circumferential direction CD2, or, a close bias. The close bias aids in the closing of lid 3. Link 60 has "shifted" and pin 5 now acts as a fulcrum on end 64B, with line 72 pulling lid 3 in circumferential direction CD2 therearound. Thus, the slotted hole 64 allows link 60 to shift thus allowing spring 40 to provide an open bias, when lid 3 is closed, as well as a close bias, when lid 3 is open.

Figure 7:
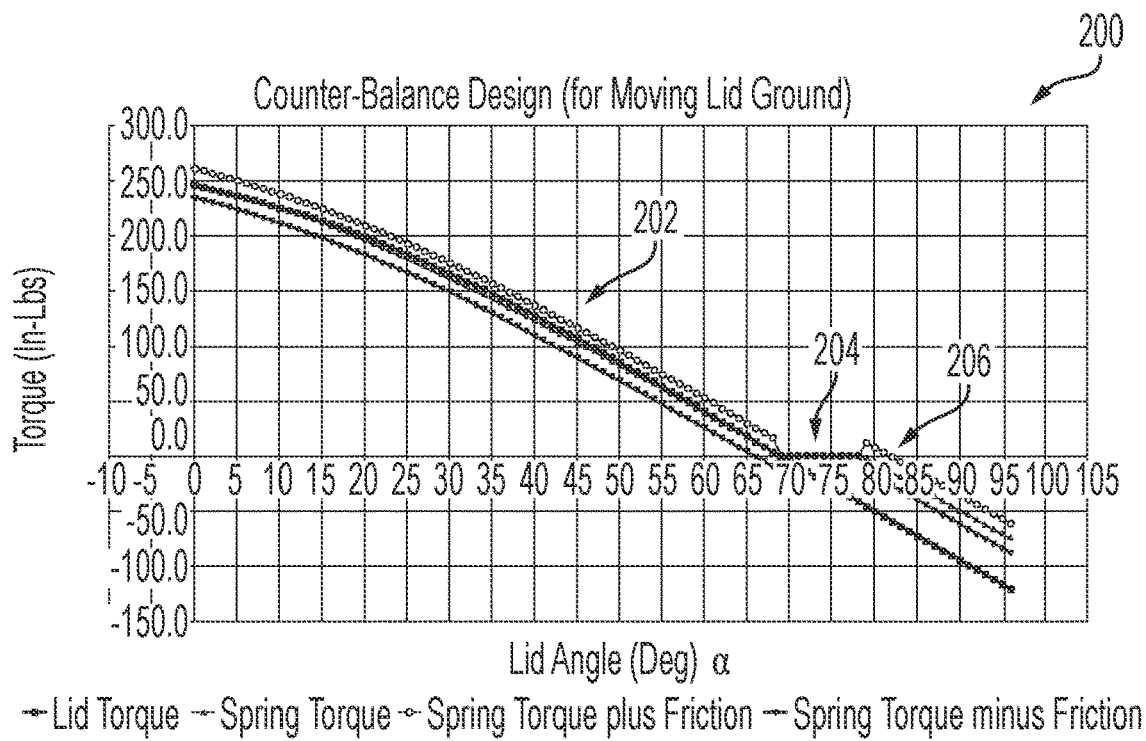
FIG. 7 shows a graph detailing the relationship of torque and lid angle for elements of the grill assembly shown in FIG. 1A.

FIG. 7 shows graph 200 detailing an example of the relationship of torque versus lid angle α for elements of grill assembly 10. Graph 200 comprises sections 202, 204, and 206. Section 202 represents the open bias of lid counterbalance assembly 20, wherein spring 40 applies an open bias on lid 3 in circumferential direction CD1 as shown in FIG. 6A. The spring torque as well as the gravity torque applied to lid 3 is at its greatest when angle α is equal to zero. The torque applied to lid 3 decreases as angle α increases until the torque reaches zero at the balanced state. Section 204 represents the balanced state of grill assembly 10, wherein no circumferential bias or torque is applied to lid 3 from spring 40, as shown in FIG. 6B. Section 206 represents the close bias of lid counterbalance assembly 20, wherein spring 40 applies a close bias on lid 3 in circumferential direction CD2 as shown in FIG. 6C. The torque applied to lid 3 increases as angle α increases.

Figure 8:
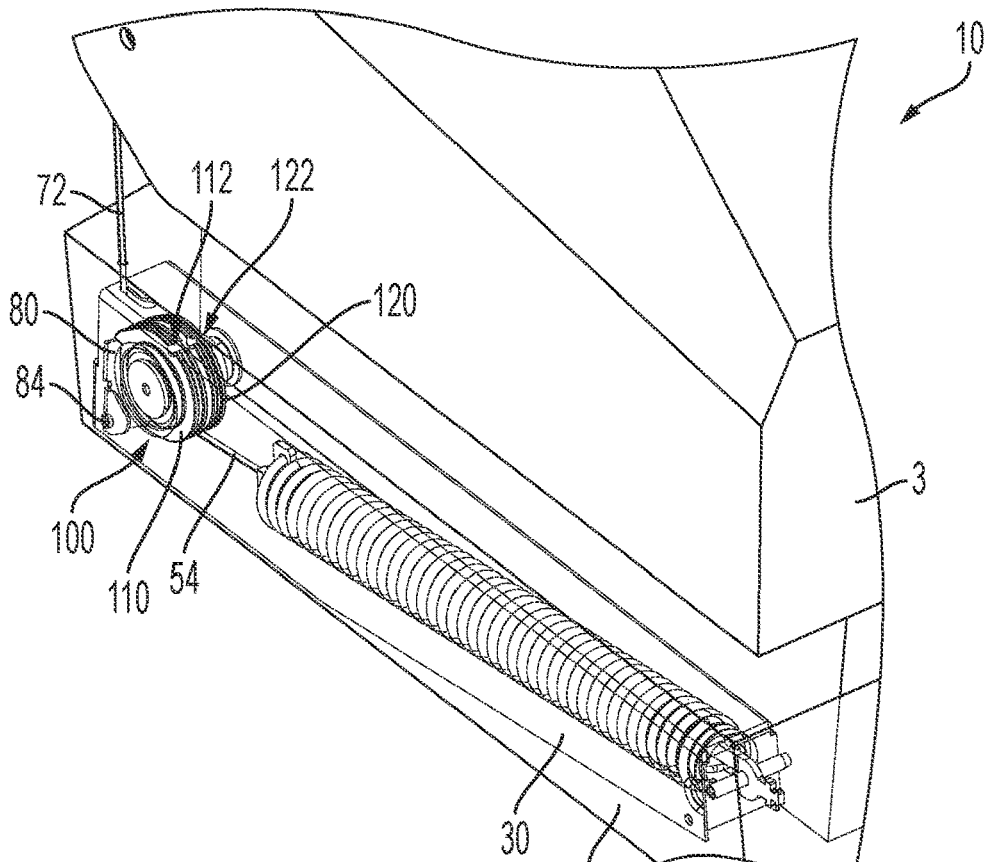
FIG. 8 is a detailed perspective view of the grill assembly shown in FIG. 1A.

FIG. 8 is a detailed perspective view of grill assembly 10. FIG. 8 shows a more detailed view of the arrangement of pulley assembly 100. Specifically, line 54 is fixedly secured to pulley 120 and line 72 if fixedly secured to pulley 110. In some embodiments, pulley 110 is circular and comprises a constant radius. In some embodiments, pulley 120 is circular and comprises a constant radius.

Figure 9:
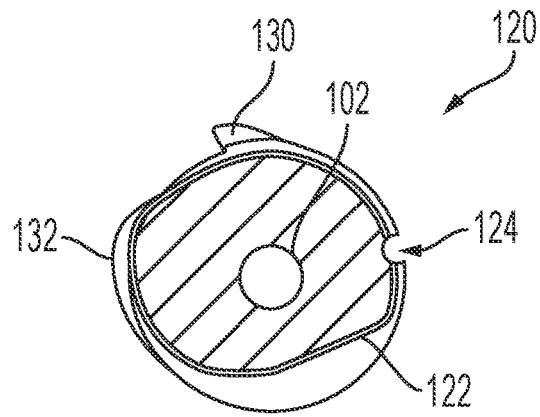
FIG. 9 is a cross-sectional view of the pulley assembly taken generally along line 9-9 in FIG. 4.
Figure 10:
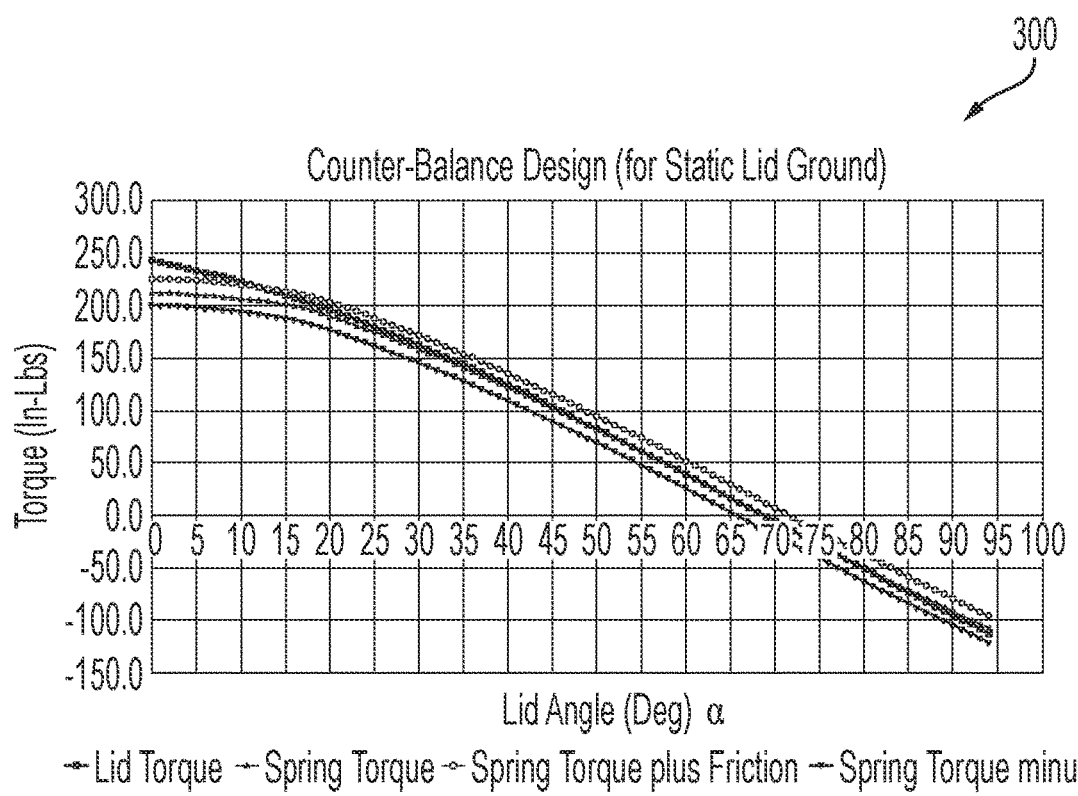
FIG. 10 shows a graph detailing the relationship of torque and lid angle for elements of the grill assembly shown in FIG. 1A.

FIG. 9 is a cross-sectional view of pulley assembly 100 taken generally along line 9-9 in FIG. 4. In some embodiments, and as shown in FIG. 9, pulley 120 is non-circular and comprises a variable radius. The use of a variable radius pulley between spring 40 and lid 3 can create a closing bias near the closed position or state. As shown, pulley 120, and specifically groove 122, comprises a variable radius including two substantial linear sections and two curvilinear sections. The variable radius pulley will allow lid 3 to slowly close on its own as it nears the closed state. FIG. 10 shows graph 300 detailing the relationship of torque versus lid angle α for elements of grill assembly 10. As shown in FIG. 10, when angle α is equal to zero, the lid torque due to gravity and the variable radius pulley 120 is greater than the spring torque, and thus when lid 3 is nearer the closed state, lid 3 tends to close on its own due to gravity as well as the variable radius pulley.

Figure 11A:
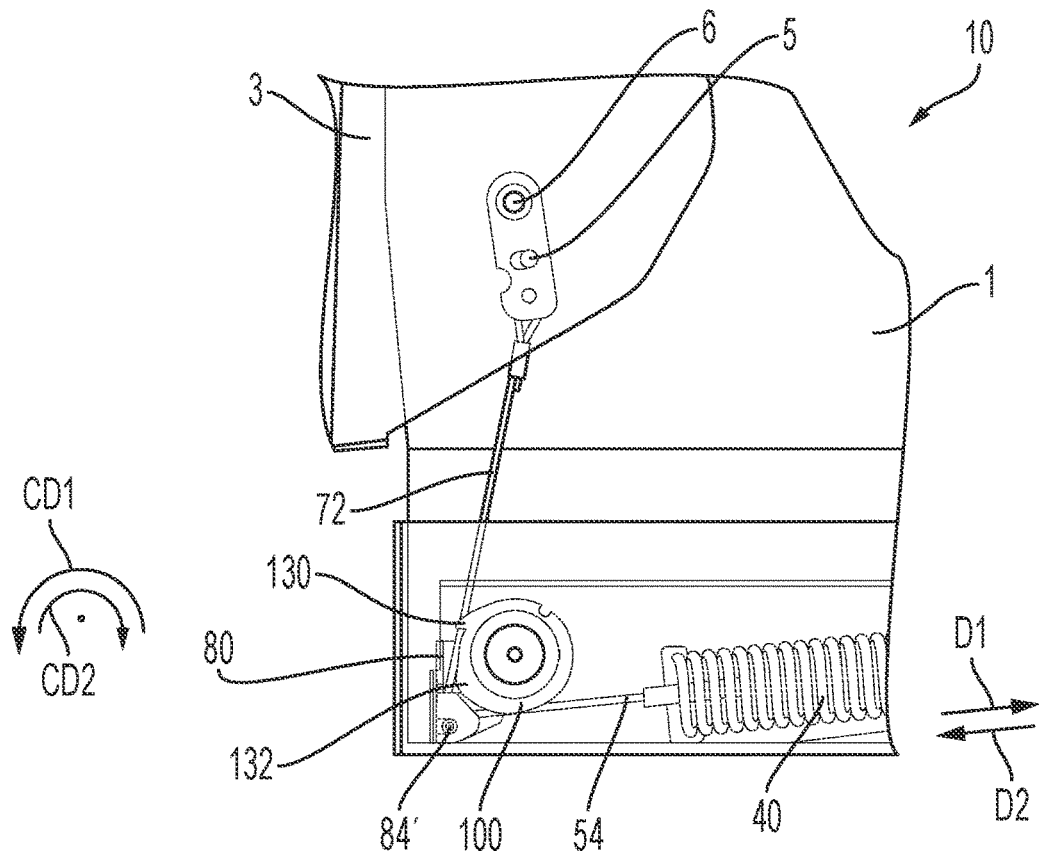
FIG. 11A is a detailed side elevational view of the grill assembly shown in FIG. 1A, in the open state, arranged horizontally.

FIG. 11A is a detailed side elevational view of grill assembly 10, in the open state and arranged horizontally. By horizontally, it is meant that grill assembly 10 is positioned on level ground. On level ground, or in the untipped condition, lockout bracket 80 is in the disengaged state, that is, lockout bracket 80 is displaced in circumferential direction CD1 such that it is disengaged with catch 130 of pulley assembly 100.

Figure 11B:
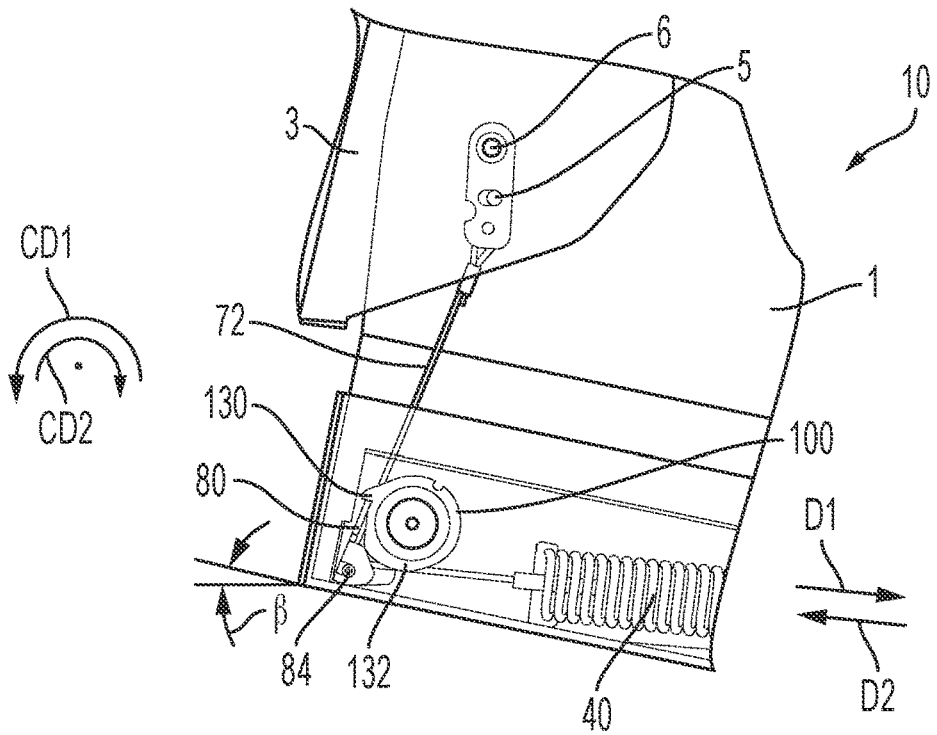
FIG. 11B is a detailed side elevational view of the grill assembly shown in FIG. 1A, in the open state, arranged at an angle.

FIG. 11B is a detailed side elevational view of grill assembly 10, in the open state, arranged at an angle. By arranged at an angle, it is meant that grill assembly 10 is positioned on unlevel ground. For example, base 1 is arranged at angle β (e.g., 10°-15°), which is representative of the grading of the ground surface. On angled ground or in the tipped condition, lockout bracket 80 displaces in circumferential direction CD2 (i.e., falls forward due to gravity) to engage catch 130. When lockout bracket 80 is engaged with catch 130, close bias or torque from spring 40 is no longer applied to lid 3. The removal of the biasing force on lid 3 prevents lid 3 from slamming shut or closed, which may occur as a result of the grading of the ground surface coupled with the close bias force applied by lid counterbalance assembly 20. If lid 3 were to slam shut, grill assembly 10 could tip over.

When grill assembly 10 is on flat ground, lockout bracket 80 is disengaged by the user closing lid 3 normally. By closing lid 3, pulley assembly 100 displaces in circumferential direction CD2 which displaces catch 130 away from lockout bracket 80. Lobe 132 displaces in circumferential direction CD2 as well and engages lockout bracket 80 pushing it back into its resting position (i.e., lobe 132 displaces lockout bracket 80 in circumferential direction CD1).

Figure 12A:
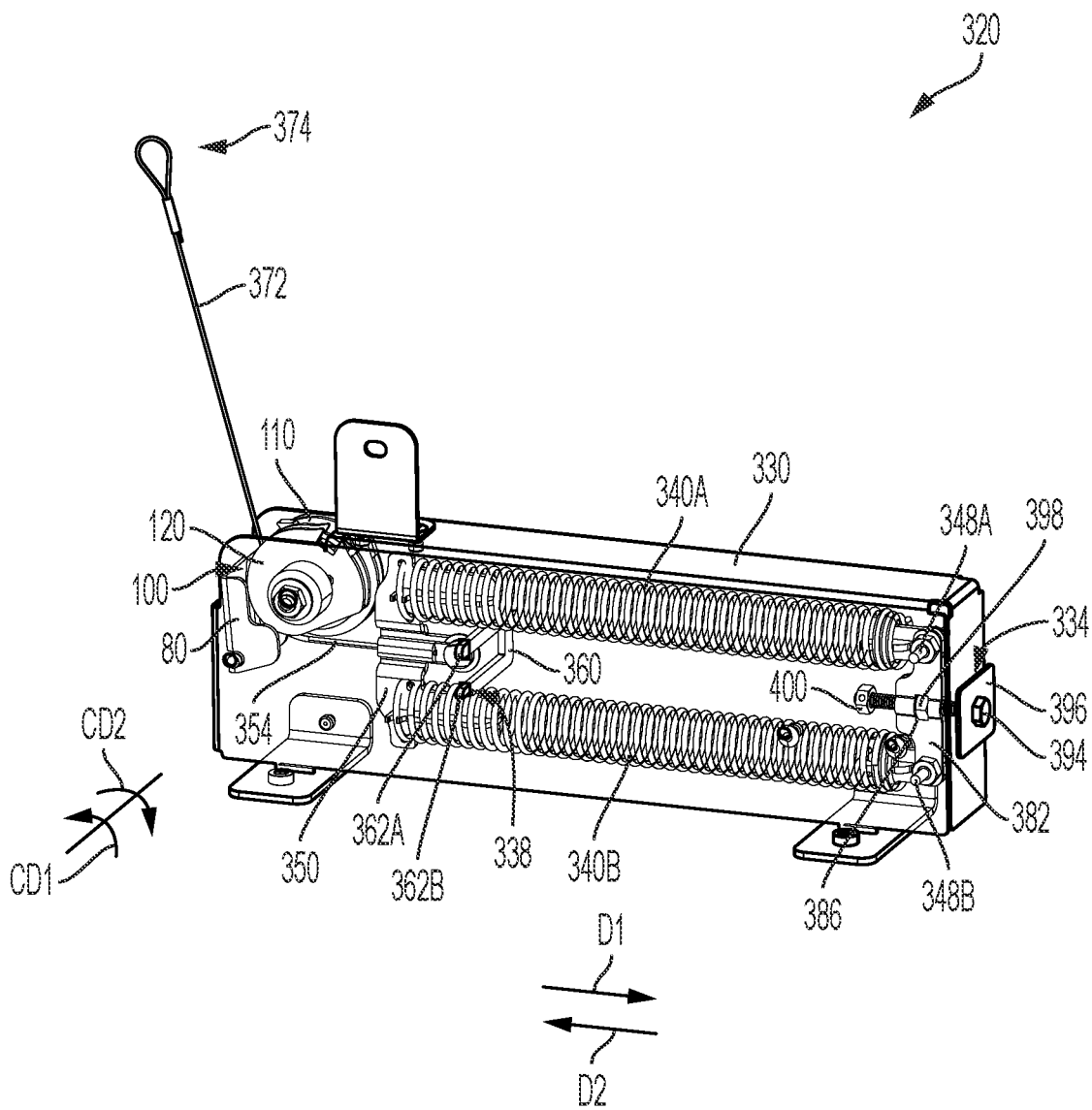
FIG. 12A is a front perspective view of a lid counterbalance assembly.
Figure 12B:
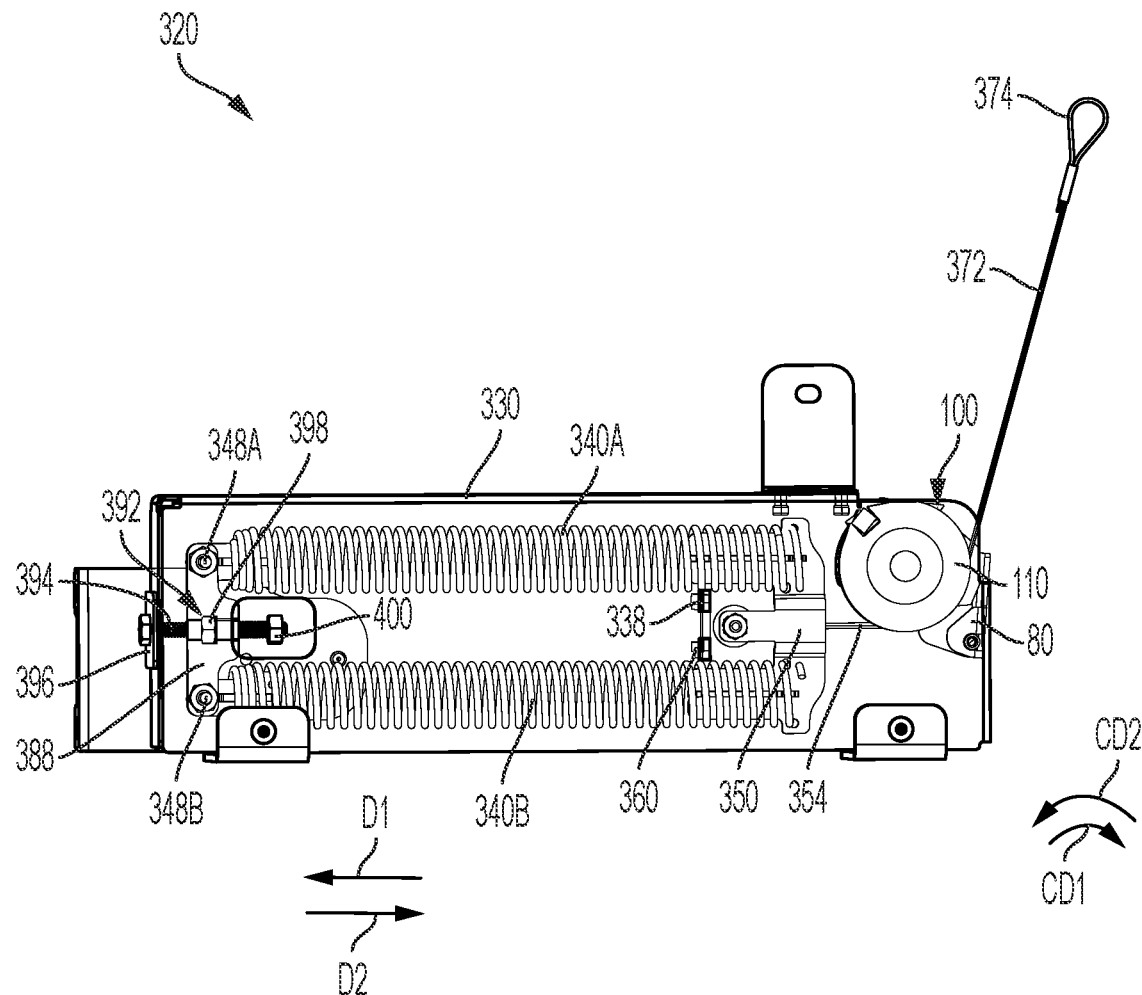
FIG. 12B is a rear perspective view of a lid counterbalance assembly.
Figure 13:
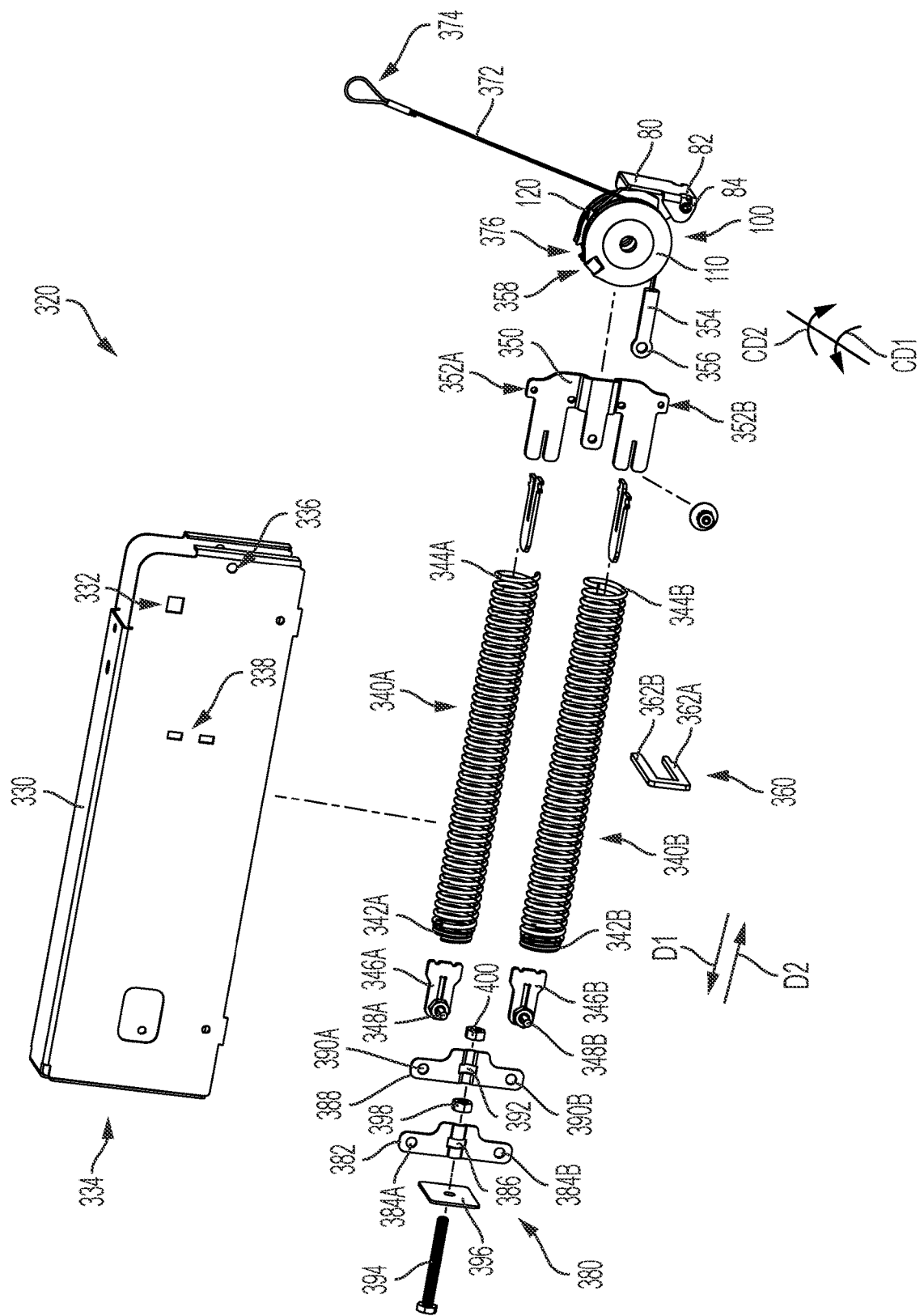
FIG. 13 is an exploded perspective view of the lid counterbalance assembly shown in FIG. 12A.

FIG. 12A is a front perspective view of lid counterbalance assembly 320. FIG. 12B is a rear perspective view of lid counterbalance assembly 320. FIG. 13 is an exploded perspective view of lid counterbalance assembly 320. Lid counterbalance assembly 320 generally comprises housing 330, one or more springs, for example, springs 340A-B, at least one line, for example line 354 and line 372, link 60, and pulley assembly 100. It should be appreciated that lines 354 and 372 may comprise any suitable connecting means, such as, for example, cable, wire, string, chain, rope, twine, metal strap, strap, etc. In some embodiments, lid counterbalance assembly 320 further comprises lockout bracket 80. Lid counterbalance assembly 320 provides torque to balance the effects of gravity on lid 3 through the opening range (i.e., fully counterbalanced). It should be appreciated that counterbalance assembly 320 can be assembled in place of or in addition to counterbalance assembly 20, namely, as part of grill assembly 10 shown in FIGS. 1A-11B. The following description should be read in view of FIGS. 1A-13.

Housing 330 is operatively arranged to be secured to a grill, for example, to base 1 and/or skirt 2. Housing 330 comprises a plurality of holes, for example, hole 332, hole 334, hole 336, and hole or holes 338. Hole 332 is operatively arranged to engage a shaft or bearing of pulley assembly 100 to rotatably connect pulley assembly 100 to housing 330. In some embodiments, lid counterbalance assembly 320 comprises friction bearing 90 operatively arranged to rotatably connect pulley assembly 100 to housing 330. In some embodiments, hole 332 is a through-hole extending through housing 330. Line 372 extends out of housing 330 to connect lid 3 to pulley assembly 100. Hole 336 is operatively arranged to engage pin 84 to rotatably connect lockout bracket 80 to housing 330. Housing 330 is secured to base 1 and/or skirt 2 via holes and bolts. However, it should be appreciated that housing 330 can be secured to base 1 and/or skirt 2 via any suitable means, for example, screws, nails, pins, rivets, dowels, brackets, welding, soldering, adhesives, etc. Hole 334 is operatively arranged to engage bolt 394 of tensioner 380 to connect springs 340A-B to housing 330, as will be described in greater detail below. Hole or holes 338 are operatively arranged to engage clip 360 to maintain a spring length during shipping and assembly, as will be described in greater detail below.

Spring 340A and spring 340B are generally coil springs arranged in housing 330 comprising end 342A and end 344A, and end 342B and 344B, respectively. Ends 342A-B are connected to housing 330 via connectors 346A-B, respectively, and tensioner 380. Tensioner generally comprises plate 382, plate 388, bolt 394, plate or washer 396, nut 398, and nut 400. Specifically, connector 346A connects end 342A to plates 382 and 388 via rod 348A. Rod 348A extends through hole 384A, hole 390A, and connector 346A. Connector 346B connects end 342B to plates 382 and 388 via rod 348B. Rod 348B extends through hole 384B, hole 390B, and connector 346B. Bolt 394 extends through plate 396 and hole 334 in housing 330 to engage nut 398. Nut 398 is rotatably connected to plates 382 and 388. Specifically, nut 398 is rotatably engaged with hole 386 and hole 392. The engagement of bolt 394 with nut 398 allows for adjustability of tensioner 380. For example, rotation of bolt 398 in a first circumferential direction displaces plates 382 and 388 in direction D1 thereby increasing the tension within springs 340A-B. Rotation of bolt 398 in a second circumferential direction, opposite the first circumferential direction, displaces plates 382 and 388 in direction D2 thereby decreasing the tension within springs 340A-B. Plate 396 acts as a washer to distribute force between bolt 394 and housing 330. In some embodiments, tensioner 380 further comprises nut or limiter 400 that acts as a limit on bolt 394 to prevent bolt 394 from being completely removed.

In some embodiments, springs 340A-B are tapered or frusto-conical at ends 342A-B, respectively. Ends 344A-B are connected to line 354 via connector 350. Connector 350 comprises a plurality of holes, for example, two holes in first or upper portion 352A and two holes in second or lower portion 352B. End 344A is fed through the two holes in upper portion 352A to secure spring 340A to connector 350, and end 344B is fed through the two holes in lower portion 352B to secure spring 340B to connector 350.

Line 354 is fixedly secured to connector 350 and comprises end 356 and end 358. For example, end 356 is secured to connector 350 via a screw. However, it should be appreciated that end 354 can be secured to connector 350 via any suitable means, for example, bolts, nails, pins, rivets, dowels, welding, soldering, adhesives, etc. End 358 is connected to pulley assembly 100. In some embodiments, end 358 is fixedly secured to pulley assembly 100.

Line 372 comprises end 374 and end 376 fixedly secured to pulley assembly 100. End 374 is connected to link 60, for example, via connector 68 and connector 70. Connectors 68 and 70 allow for rotatable connection between link 60 and line 372. It should be appreciated that line 372 may be connected to link 60 via any means suitable for rotatable connection, for example, bolts, rivets, nails, screws, dowels, pins, etc.

Clip 360 is operatively arranged to engage both housing 330 and connector 350. In order to maintain proper assembly during shipping, as well as to allow adequate slack in line 372 such that it can be assembled on grill assembly 10, it is desirable to elongate springs 340A-B. As such, and as best shown in FIGS. 12A-B, connector 350 is displaced in direction D2 with respect to housing 330. Then clip 360, specifically prongs 362A-B, is inserted through housing 330 via holes 338. Connector 350 may then be released and tension in springs 340A-B cause connector 350 to abut against clip 360. Once lid counterbalance assembly 320 has arrived at its destination and is properly installed on grill assembly 10, clip 360 can be removed thereby allowing springs 340A-B to load tension into pulley assembly 100 and thus line 372. In other words, assembly of clip 360 in housing 330 removes tension in springs 340A-B (similar to the effect of the engagement of lockout bracket 80 with catch 130).

It should be appreciated that the springs herein, for example, spring 40, spring 340A, and/or spring 340B may comprise any suitable component that provides a biasing force on pulley assembly 100. For example, instead of a linear spring such as a tension or compression spring, a linear actuator, tension element, gas or pneumatic cylinder, electric drive, elastic element, or other biasing element can be used.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Base
2 Skirt
3 Lid
4 Handle
5 Pin
6 Pin
10 Grill or smoker assembly
20 Lid or cover or hood counterbalance assembly
30 Housing
32 Hole
34 Hole
36A Hole
36B Hole
36C Hole
38 Slot
40 Spring
42 End
44 End
46 Connector
48 Rod
50 Connector
52A Hole
52B Hole
54 Line
56 End
58 End
60 Link
62 Hole
64 Hole
64A End
64B End
66 Hole
70 Connector 72 Line
74 End
76 End
80 Lockout bracket
82 Hole or holes
84 Pin
90 Shaft or bearing or friction bearing
100 Pulley Assembly
102 Through-bore
104 Radially inward facing surface
106 Radially inward facing surface
110 Pulley
112 Groove
114 Channel
120 Pulley
122 Groove
124 Channel
130 Catch
132 Lobe
200 Graph
202 Section
204 Section
206 Section
300 Graph
320 Lid or cover or hood counterbalance assembly
330 Housing
332 Hole
334 Hole
336 Hole
338 Hole(s)
340A Spring
340B Spring
342A End
342B End
344A End
344B End
346A Connector
346B Connector
348A Rod
348B Rod
350 Connector
352A Portion
352B Portion
354 Line
356 End
358 End
360 Clip
362A Prong
362B Prong
372 Line
374 End
376 End
380 Tensioner
382 Plate
384A Hole
384B Hole
386 Hole
388 Plate
390A Hole
390B Hole
392 Hole
394 Bolt
396 Plate or washer
398 Nut
400 Nut
CD1 Circumferential direction
CD2 Circumferential direction
D1 Direction
D2 Direction
α Angle
β Angle

What is claimed is:

1. A lid counterbalance assembly for a grill, the grill including a lid and a base, the lid counterbalance assembly comprising:
   a pulley assembly including at least one pulley, the pulley assembly rotatably connected to the base;
   a spring connected to the pulley assembly via a first line;
   a second line comprising a first end connected to the pulley assembly and a second end connected to the lid, wherein the second end is rotatable and translatable with respect to the lid;
   a lockout bracket operatively arranged to engage the pulley assembly to prevent displacement of the pulley assembly in a first circumferential direction; and
   wherein the pulley assembly further comprises a radially outward extending lobe operatively arranged to displace the lockout bracket in the first circumferential direction.

2. The lid counterbalance assembly as recited in claim 1, further comprising a link rotatably connected to the second end, wherein the link comprises a slotted hole operatively arranged to engage a pin extending from the lid.

3. The lid counterbalance assembly as recited in claim 2, wherein:
   in a first state of the lid counterbalance assembly, the pin is engaged with a first end of the slotted hole; and,
   in a second state of the lid counterbalance assembly, the pin is engaged with a second end of the slotted hole.

4. The lid counterbalance assembly as recited in claim 1, further comprising a housing operatively arranged to be fixedly secured to the base, wherein the pulley assembly and the spring are connected to the housing.

5. The lid counterbalance assembly as recited in claim 1, wherein the pulley assembly is connected to the base via a friction bearing.

6. The lid counterbalance assembly as recited in claim 1, wherein the at least one pulley comprises:
   a first pulley; and,
   a second pulley non-rotatably connected to the first pulley.

7. The lid counterbalance assembly as recited in claim 6, wherein the first line is fixedly secured to the first pulley and the second line is fixedly secured to the second pulley.

8. The lid counterbalance assembly as recited in claim 7, wherein the first pulley comprises a constant diameter and the second pulley comprises a constant diameter.

9. The lid counterbalance assembly as recited in claim 7, wherein the first pulley comprises a variable diameter and the second pulley comprises a constant diameter.

10. The lid counterbalance assembly as recited in claim 1, wherein the pulley assembly further comprises a radially outward extending catch operatively arranged to engage the lockout bracket.

11. A grill assembly, comprising:
   a base;
   a lid hingedly connected to the base; and,
   a counterbalance assembly, including:
      a pulley assembly rotatably connected to the base, the pulley assembly comprising:
         a first pulley; and,
         a second pulley non-rotatably connected to the first pulley;

a spring connected to the first pulley via a first line, the spring biasing the pulley assembly in a first circumferential direction;

a second line comprising a first end connected to the second pulley and a second end connected to the lid, wherein the second end is rotatable and translatable with respect to the lid;

a lockout bracket operatively arranged to engage a radially extending catch of the pulley assembly to prevent displacement of the pulley assembly in the first circumferential direction; and a radially outward extending lobe operatively arranged to displace the lockout bracket in the first circumferential direction to disengage the catch.

12. The grill assembly as recited in claim 11, wherein:
the lid comprises a pin extending therefrom; and,
the counterbalance assembly further comprises a link rotatably connected to the second end, the link comprising a slotted hole engaged with the pin.

13. The grill assembly as recited in claim 12, wherein: in a first state of the lid counterbalance assembly, the pin is engaged with a first end of the slotted hole; and, in a second state of the lid counterbalance assembly, the pin is engaged with a second end of the slotted hole.

14. The lid counterbalance assembly as recited in claim 11, wherein the first pulley comprises a constant diameter and the second pulley comprises a constant diameter.

15. The lid counterbalance assembly as recited in claim 11, wherein the first pulley comprises a variable diameter and the second pulley comprises a constant diameter.

* * * * *